Patented Sept. 1, 1925.

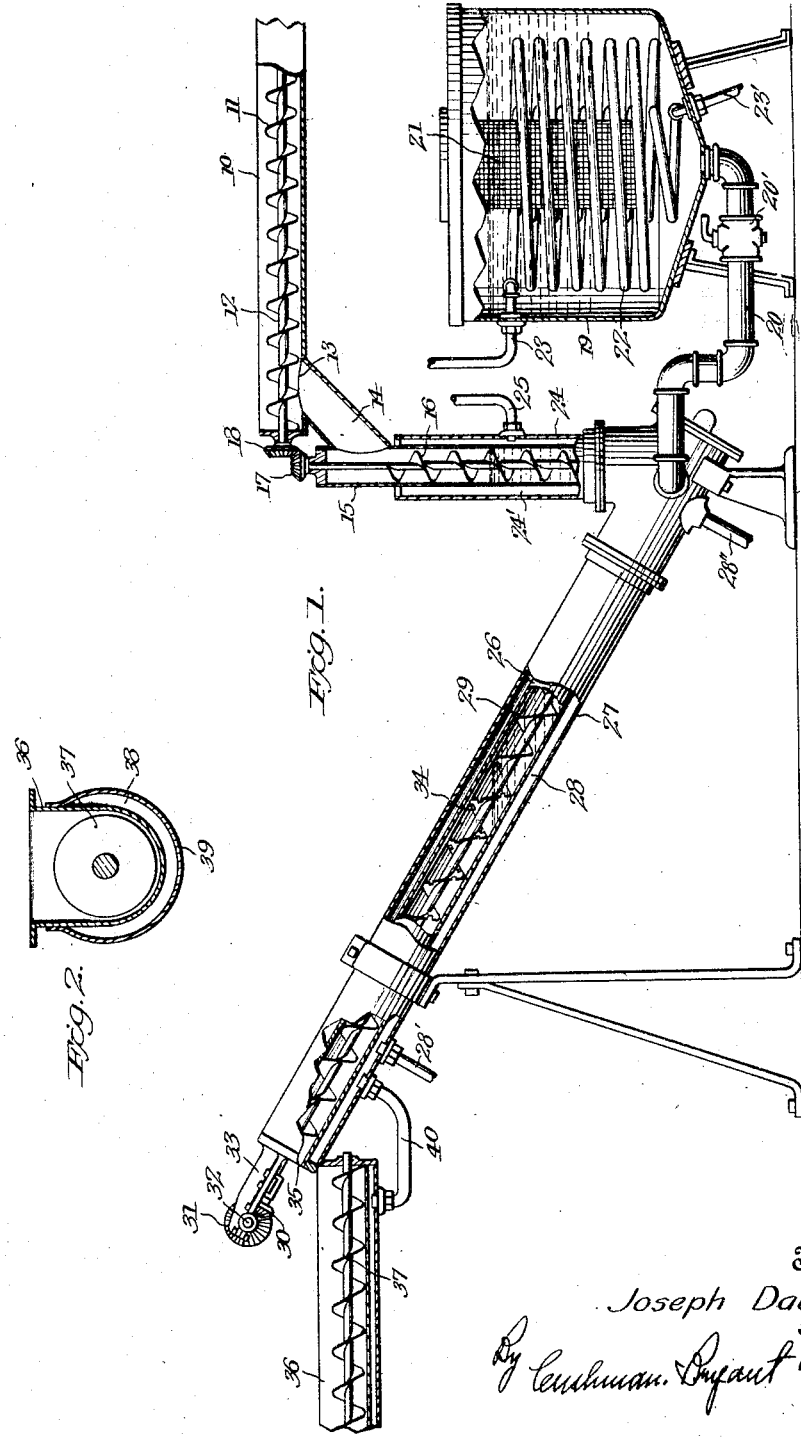

1,551,645

UNITED STATES PATENT OFFICE.

JOSEPH DAVIDSON, OF ATLANTA, GEORGIA, ASSIGNOR OF ONE-HALF TO THOMAS D. WOOD, OF FOUNTAIN INN, SOUTH CAROLINA.

PROCESS AND APPARATUS FOR PRODUCING FIRE-KINDLER MATERIAL.

Application filed January 13, 1925. Serial No. 2,223.

*To all whom it may concern:*

Be it known that JOSEPH DAVIDSON, a citizen of the United States, residing at Atlanta, in the county of Fulton and State of Georgia, has invented new and useful Improvements in Processes and Apparatus for Producing Fire-Kindler Material, of which the following is a specification.

The present invention relates to a process and apparatus intended for use in connection with the preparation of material for fire kindlers, which, ordinarily, are made in briquettes of a size sufficient to produce a flame adapted to ignite coal or other fire material.

The process and apparatus of the present application relates primarily to production of the fire kindler disclosed in the reissued Letters Patent 15,851, granted to Clarence W. Garrett, June 3, 1924. In that patent there is disclosed a fire kindler briquette consisting of relatively small pieces of wood or wood-like substance, thoroughly coated and impregnated with a suitable carbonaceous material, such as resin.

An object of the present invention is to provide a process by which may be obtained thorough coating and impregnation of the woody particles or chips; to effect the coating and impregnation continuously and without waste of the resinous liquid, and to insure the maintenance of the material in proper condition, with the resin in a viscous state, until the molding operation.

A further object of the invention is to provide an apparatus in which the material may be treated without handling and additional quantities of resin supplied thereto, and, preferably, with the resin being automatically reduced to liquid form and mixed with the shavings or other divided substance.

The above and other objects of the invention will become clearer as the description proceeds in connection with the following description of certain embodiments of the invention illustrated in the accompanying drawings, wherein:

Figure 1 is a side view of an apparatus with parts broken away.

Figure 2 is a section on the line 2—2 of Figure 1, and

Figure 3:
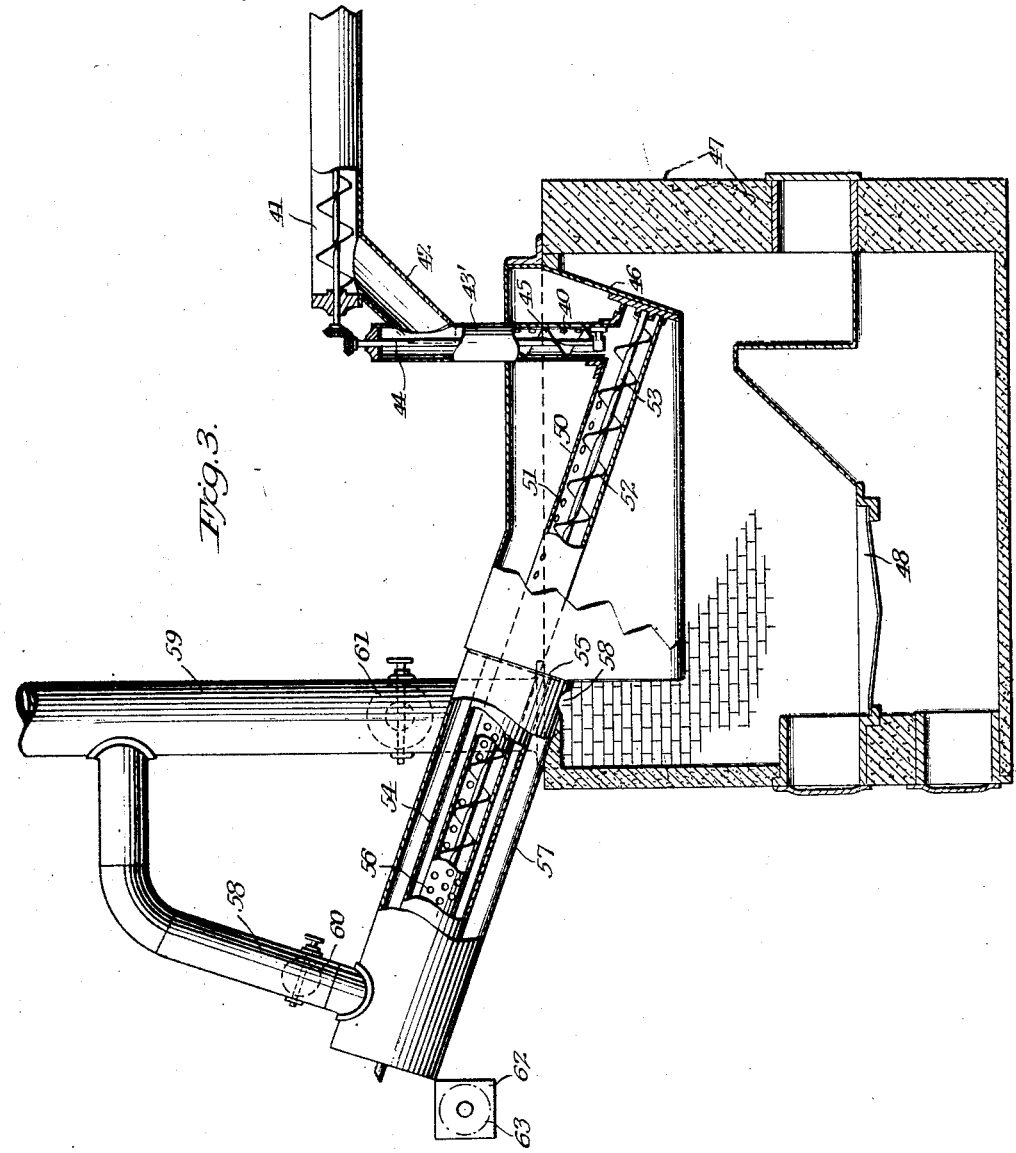
Figure 3 is a sectional view of a modified form of apparatus.

In order that fire kindlers of the type disclosed in the patent above mentioned may be sold at a relatively small cost, it is desirable that any process employed for the production of the same may be carried out in a continuous manner, without the necessity of manual handling, as distinguished from mechanical handling, of the material from the time it is presented to the resin until the briquettes are completed.

The present application is directed to the process and apparatus for treating the material and bringing it to a state where it is suitable for molding. In a co-pending application filed January 13, 1925, Ser. No. 2,224, there is shown and described a machine for molding the material after it is coated and impregnated, although it will be understood that the process and apparatus of this application is not limited to use in connection with the molding machine disclosed in the companion application.

Referring, first, to the general features of the process, it will be understood that the material which forms the base of the kindler is preferably wood or of woody character. As described in the patent referred to, the wood is reduced to relatively small particles, and these are impregnated and coated with a suitable carbonaceous material, such as resin. The preferred manner of effecting this impregnation involves the immersion of the particles in a body of heated carbonaceous material, such as liquid resin. The resin is maintained heated to substantially its boiling point by any suitably means, and the reduced material upon being introduced therein is agitated to insure thorough coating and saturation of every particle. This agitation assists in the impregnation of the particles, the heat serving to drive off sap and other undesirable constituents of the wood which would impede its ignition, and the resin replacing such constituents. It will be understood, of course, that by wood is meant any woody substance or wood-like material adapted to be formed into particles of the desired character, and the term "resin" is employed throughout the specification and claims as covering any carbonaceous liquid having the same general characteristics as resin.

After immersion and agitation in the resin for a length of time suitable to effect the result desired, the material is removed and the excess resin permitted to drain therefrom. Heat is applied to the material while being drained in order to prevent the resin from hardening before the molding step, and it is also desirable to agitate the material to facilitate the complete draining off of the surplus resin before the material is introduced into the molds.

It is, of course, important that the process be carried out by mechanical means and with the least delay to effect impregnation and coating of the particles. The material is fed through the body of liquid, preferably downwardly, so that it will be mixed thoroughly and the feeding means may be of a character adapted to effect agitation of the material while it is being passed through the liquid. The draining may be accomplished by moving the material out of the liquid along the upwardly inclined path by a suitable feeding mechanism which will also agitate the material while being drained. When thus carried out, the process is a continuous one, devoid of manual operations; after draining the material may be carried, by mechanical means, if desired, to molds, into which it is introduced.

In the accompanying drawings there are illustrated two forms of apparatus for carrying out this process. Referring to Figure 1, 10 indicates a hopper for the loose material, which is reduced to a relatively fine state, as has been described. Suitable feeding mechanism, such as the feed screw 11 upon the shaft 12, driven from a source of power (not shown) serves to direct the particles toward a discharge opening 13. The material passes through this opening downwardly through a chute 14 into an immersion and agitating chamber 15, through which it is fed downwardly by a feed screw 16 upon a shaft 17, the latter being driven from shaft 12 through bevel gears 18.

The resin is supplied to the chamber 15 from a vat 19 connected therewith by means of a pipe 20 which is provided with a valve 20' to control the flow of resin to the chamber from the vat 19. Resin in a hard state may be placed in a foraminous cage 21 within the vat and the steam coil 22, which receives the stream through a connection 23, will afford sufficient heat to reduce the hard resin to a liquid within the vat, and the level of the resin may be controlled by varying the quantity of hard resin supplied to the basket 21. Condensed steam may be discharged from the coil through an outlet 23'. Due to the connection 20 between the vat 19 and chamber 15, the level in the chamber will be same as that in the vat. The chip-like or finely divided material is carried downwardly through the liquid in the chamber 15 by the feed screw 17, and is thoroughly agitated as it is passed through the liquid. The chamber 15 is surrounded by a steam jacket 24, suitably spaced from the wall of the compartment to afford a steam chamber 24' supplied with steam through an inlet pipe 25. The steam serves as a heating means for maintaining the resin in the chamber 15 in a liquid state, and the heat should be sufficient to drive off the foreign matter from the wood, and replace the same with resin. The compartment 15 connects at its lower end with the laterally and upwardly extending tube 26, forming a continuation of the chamber, and which is also provided with the steam jacket 27, spaced from the wall of the tube 26 to provide a steam chamber 28 in communication with the chamber 24', and adapted to receive steam through an inlet 28'. Condensed steam from the steam chamber 24' and 28 may be discharged through an outlet 28'' at the lower end of these chambers.

It will be understood that the body of liquid extends through the tube 26 to substantially the level line of the liquid in the vat 19 and compartment 15 so that up to this level, the laterally and upwardly extending tube 26 forms an extension of the mixing and agitating compartment 15. A screw conveyor 29 extends through the tube 26 and beyond the upper end of the same is provided with a bevel gear 30, which meshes with a gear 31 upon a suitable drive shaft 32, the latter being mounted in a bracket 33. The material upon reaching the lower end of the chamber 15, passes to the conveyor 29, which carries the same upwardly out of the body of liquid. After the material carried by the conveyor 29 passes the level of the liquid, any excess resin may drain off and return to the body of the same, due to the fact that the material is being carried along an upwardly inclined path, the draining being facilitated by the agitation of the material. The conveyor is provided with cut away portions 34, which permit the resin to flow back to the body of the same.

It will be noted that the steam jacket 28 extends throughout the length of the tube 26 so that the material is kept heated and the resin which coats the wood will not harden before the material reaches the molds.

The conveyor 29 directs the material through the open upper end 35 into a trough 36, in which is positioned a feed screw 37, serving to carry the coated and impregnated particles to a suitable molding machine (not shown). As above stated, a preferred form of molding machine is disclosed in my copending application filed January 13, 1925, Ser. No. 2,224, but since the present invention is not limited to the details of the molding machine and suitable molding mechanism is old and well known in the art, it is not thought necessary to describe such mechanism in the present application. It will be observed that the trough 36, while open at its top, is partially surrounded by a steam compartment 38 formed by a jacket 39 spaced from the wall of the hopper. The steam may be introduced into this compartment through a connection 40 with the compartment 28, and thus the resin or material is maintained in a substantially viscous state until the material is introduced into the molds.

Referring to Figure 3, there is here shown a somewhat modified form of the invention, the general characteristics of which are the same as the apparatus already described. A hopper 41 for the material directs the same through a chute 42 into a vertical mixing chamber 43 having a shaft 44 carrying a feed screw 45. The chamber 43 extends downwardly into a vat or container 46 for the liquid resin, which is maintained in a liquid state to substantially its boiling point by the heat from a furnace 47, having a fire grate 48. The compartment 44 extends downwardly into the vat 46 and that portion of the same within the vat is provided with perforations 49, so that the level of the liquid in the chamber 44 may be the same as that in the vat. The lower end of the compartment or tube 44 opens into a laterally and upwardly extending tube 50, also having openings 51, to permit the liquid to flow thereinto, and carrying a feed screw 52 upon a shaft 53. It will be understood that the conveyor 45 carries the material downwardly through the liquid, at the same time agitating it; the material passes to the conveyor 52 and is carried upwardly through the tube 50.

Upon the exterior of the vat 46 the tube 50 is surrounded by a sleeve 54, which, at its lower end 55, opens into the container 46. As the material is agitated within that portion of the tube which is surrounded by the sleeve 54, excess fluid will drip through the openings 56 therein into the tube, and then drain back into the container 46. It is desirable, of course, to maintain the resin which coats the particles of material in a viscous state until the material reaches the molds. To accomplish this, the sleeve 54 is surrounded by a pipe 57 extending into the furnace and having an inlet opening 58, through which the products of combustion may pass thereinto. The tube 57 is co-extensive with the feed tube 50 and directs the products of combustion to a pipe 58, which communicates with the furnace stack 59. The latter at its lower end is in direct communication with the interior of the furnace, and both the pipe 58 and stack 59 are provided with dampers 61, by means of which the volume of the products of combustion directed through the pipe 57 may be regulated. Obviously, the extent to which the dampers 60 and 61 are opened or closed will vary the volume of products of combustion directed through the pipe 57, and, consequently, the heat therein will be controlled.

The material is fed by the conveyor 52 through the open end of the tube 50 into a suitable trough 62 having a feed screw 63 therein, and from this hopper the material is carried to the molding machine.

It will be observed that substantially the only distinction between the apparatus of Figure 1 and that of Figure 3 is that, in the latter, the resin is liquefied and maintained in liquid state by the products of combustion, whereas in the former the heating medium employed is steam. In both devices, the comminuted material is fed downwardly through the liquid resin and agitated while in the resin. Subsequent to the immersion and simultaneous agitation of the material it is removed from the resin and the excess liquid permitted to drain therefrom, the draining being facilitated by the feeding of the material out of the body of liquid along an upwardly inclined path and its agitation while being drained. Moreover, it will be noted that in both forms, provision is made for heating the material after removal from the body of liquid, in order to maintain the resin in a viscous state until the thoroughly coated and impregnated particles are fed into the molds.

It will be understood that such modifications may be made in the process and apparatus disclosed as come within the scope of the invention, which is more particularly defined in the following claims.

I claim—

1. The process for producing fire kindler material which consists in reducing woody material to relatively small pieces, completely immersing the reduced material in a body of heated resinous liquid, agitating the material while in the liquid, removing the material from the liquid and permitting the excess liquid to drain therefrom.

2. The process for producing fire kindler material which consists in reducing woody material to relatively small pieces, completely immersing the reduced material in a body of heated resinous liquid, agitating the material while in the liquid, removing the material from the liquid, permitting the excess liquid to drain therefrom, and maintaining the material heated until ready for molding into briquettes.

3. The process for producing fire kindler material which consists in reducing woody material to relatively small pieces, continuously passing the reduced material completely immersed through a body of heated liquid resin, and agitating the material as it is passed therethrough.

4. The process for producing fire kindler material which consists in reducing woody material to relatively small pieces, passing the reduced material completely immersed through a body of heated liquid resin, agitating the material as it is passed therethrough, removing the material from the liquid and permitting excess liquid to drain off the material.

5. The process for producing fire kindler material which consists in reducing woody material to relatively small pieces, passing the reduced material completely immersed through a body of heated liquid resin, agitating the material as it is passed therethrough, removing the material from the liquid, permitting excess liquid to drain off the material and maintaining the material heated during such draining until ready for molding into briquettes.

6. The process for producing fire kindler material which consists in continuously feeding the same into and through a body of liquid resin completely immersed, maintaining the resin heated, agitating the material as it is passed through the resin, feeding the material out of the liquid so as to permit the excess liquid to drain back into the body of the same.

7. The process for producing fire kindler material which consists in continuously forcing the same downwardly into and through a body of liquid resin, maintaining the resin heated, agitating the material as it is passed through the resin, feeding the material out of the liquid so as to permit the excess liquid to drain back into the body of the same.

8. In a device of the class described, a container for liquid, means for heating the liquid in said container, means directed downwardly into the container and adapted to project through the liquid therein a substantial distance for positively forcing finely divided material downwardly through the heated liquid and agitating it therein, and means for feeding the material out of the liquid in an upwardly inclined plane and simultaneously draining the material.

9. In a device of the class described, a container for liquid, means for heating the liquid in said container, means directed downwardly into the container and adapted to project through the liquid therein a substantial distance for positively forcing finely divided material downwardly through the liquid and agitating it therein, and means for feeding the material out of the liquid in an upwardly inclined plane and simultaneously draining the material, said means permitting the surplus liquid to drain back into said container.

10. In a device of the class described, a container for liquid resin, means for heating the resin in said container, a mixing compartment in communication with said container and adapted to receive liquid therefrom, means for introducing divided woody material into said compartment, means directed downwardly into the container and adapted to project through the liquid therein a substantial distance for positively forcing the material downwardly through the compartment and the liquid therein and for agitating the material as it passes therethrough, and an upwardly inclined outlet passage through which the material is fed for discharge whereby the surplus liquid may drain back into the compartment, said agitating means being operative within said passage.

11. In a device of the class described, a container for liquid resin, means for heating the resin in said container, a mixing compartment in communication with said container and adapted to receive resin therefrom, means for introducing divided woody material into said compartment, means directed downwardly into the container and adapted to project through the liquid therein a substantial distance for positively forcing the material downwardly through the compartment and the liquid therein, and for agitating the material as it passes therethrough, and an upwardly inclined outlet passage through which the material is fed for discharge whereby the surplus liquid may drain back into the compartment, said agitating means being operative within said outlet passage, and means for heating the material and liquid in said passage and compartment.

12. In a device of the class described, a container for liquid resin, a foraminous basket for hard resin in said container, means for heating the resin in said basket and reducing the same to a liquid state whereby it may flow into the container, a coating and impregnating compartment in communication with said container and adapted to receive liquid resin therefrom, means for introducing divided woody material into said compartment, means directed downwardly into the container and adapted to project through the liquid therein a substantial distance for positively forcing the material downwardly through the liquid in said compartment and agitating the material therein, means for feeding the material out of said liquid along an upwardly inclined path, and means for heating the liquid and material in said compartment, said heating means being adapted to heat the material and liquid as it is passed upwardly along said inclined path.

13. In a device of the class described, a container for liquid resin, a foraminous basket for hard resin in said container, means for heating the resin in said basket and reducing the same to a liquid state whereby it may flow into the container, a coating and impregnating compartment in communication with said container and adapted to receive liquid resin therefrom, means for introducing divided woody material into said compartment, means directed downwardly into the container and adapted to project through the liquid therein a substantial distance for positively forcing the material downwardly through the liquid in said compartment and agitating the material therein, means for feeding the material out of said liquid, and means for heating the liquid and material in said compartment.

14. In a device of the class described, a container for liquid resin, a foraminous basket for hard resin in said container, means for heating the resin in said basket and reducing the same to a liquid state whereby it may flow into the container, a coating and impregnating compartment in communication with said container, and adapted to receive liquid resin therefrom, means for introducing divided woody material into said compartment, means directed downwardly into the container and adapted to project through the liquid therein a substantial distance for positively forcing the material downwardly through the liquid in said compartment and agitating the material therein, and means for feeding the material out of said liquid along an upwardly inclined path whereby the surplus liquid may drain back into the compartment, means for heating the liquid and material in said compartment, said means being adapted to heat the material and liquid as it is passed upwardly along said inclined path.

In testimony whereof I have hereunto set my hand.

JOSEPH DAVIDSON.